(12) United States Patent
Fislage et al.

(10) Patent No.: US 7,962,264 B2
(45) Date of Patent: Jun. 14, 2011

(54) METHOD AND APPARATUS FOR ADAPTING A MONITORING DEVICE OF A CONTROL UNIT FOR A RESTRAINT SYSTEM OF A MOTOR VEHICLE

(75) Inventors: Markus Fislage, Leonberg (DE); Ruediger Karner, Kornwestheim (DE); Alexander Jansen, Stuttgart (DE); Christophe Kolb, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 777 days.

(21) Appl. No.: 11/666,203

(22) PCT Filed: Aug. 15, 2005

(86) PCT No.: PCT/EP2005/053999
§ 371 (c)(1),
(2), (4) Date: Feb. 28, 2008

(87) PCT Pub. No.: WO2006/045651
PCT Pub. Date: May 4, 2006

(65) Prior Publication Data
US 2008/0257076 A1 Oct. 23, 2008

(30) Foreign Application Priority Data
Oct. 21, 2004 (DE) .......................... 10 2004 051 274

(51) Int. Cl.
*B60R 22/00* (2006.01)
(52) U.S. Cl. .......................................... 701/45; 701/39
(58) Field of Classification Search .................... 701/39, 701/45; 180/271; 280/728.1
See application file for complete search history.

(56) References Cited

U.S. PATENT DOCUMENTS

| 6,643,574 | B1 | 11/2003 | Swart et al. | |
|---|---|---|---|---|
| 6,728,613 | B2 * | 4/2004 | Ishizaki et al. | 701/36 |
| 6,970,778 | B1 * | 11/2005 | Feser et al. | 701/45 |
| 2005/0033496 | A1 * | 2/2005 | Iyoda et al. | 701/38 |
| 2005/0209753 | A1 * | 9/2005 | Koehler et al. | 701/45 |

FOREIGN PATENT DOCUMENTS

| DE | 199 09 403 | 9/2000 |
|---|---|---|
| DE | 100 57 916 | 5/2002 |
| DE | 103 06 707 | 8/2004 |
| DE | 103 07 177 | 9/2004 |
| JP | 7125602 | 5/1995 |
| JP | 10086788 | 4/1998 |
| JP | 2000168492 | 6/2000 |
| JP | 2002067870 | 3/2002 |

* cited by examiner

*Primary Examiner* — Mark Hellner
*Assistant Examiner* — Helal A Algahaim
(74) *Attorney, Agent, or Firm* — Kenyon & Kenyon LLP

(57) ABSTRACT

A method for adapting a monitoring device of a control unit for a restraint system of a motor vehicle, having a redundant detection device and a triggering unit, having the method steps of: providing a first definable threshold value as a timing pattern for the monitoring device in a first operating range of the motor vehicle; detecting at least a second operating range of the motor vehicle by way of the redundant detection device at a first point in time; and transferring data from the redundant detection device to the monitoring device in order to adapt the monitoring device by utilizing at least one second definable threshold value in the second operating range of the motor vehicle, and an apparatus therefor.

9 Claims, 1 Drawing Sheet

METHOD AND APPARATUS FOR ADAPTING A MONITORING DEVICE OF A CONTROL UNIT FOR A RESTRAINT SYSTEM OF A MOTOR VEHICLE

BACKGROUND INFORMATION

A restraint system of a motor vehicle—for example an airbag—evaluates, in a control unit, acceleration signals from sensors in the context of a collision or crash, in order to trigger in suitable fashion a restraint device such as, for example, the airbag. The control unit furthermore supports various monitoring devices in order to prevent the risk of improper triggering. This is accomplished by a "plausibilization" by way of a redundant hardware section constituting a detection device, so that a triggering decision cannot be taken solely by the control unit's software.

This redundant hardware section can be embodied in a variety of versions. The possible bandwidth extends from a simple reed contact (Hamlin sensor) that enables triggering of the airbag only once a specific acceleration value has been exceeded, to a complex hardware logic that, similarly to crash detection using a software algorithm, performs an evaluation of sensor acceleration values. This ensures that triggering is enabled only if a collision is detected and plausibilized by the hardware section, i.e. the redundant detection device.

A further element of the safety concept is constituted by a monitoring device for the program sequence in the microcontroller of the control unit. This monitoring device is known as a "watchdog." This monitoring device is intended to detect a fault condition of the microcontroller as promptly as possible, in order to prevent uncontrolled actions by the control unit. The watchdog's hardware must be regularly operated, in a predefined fixed timing pattern, by the program executing on the microcontroller. If that is not the case, interception actions are initiated, for example inhibition of the airbag triggering sections or a reset of the microcontroller.

In the motor vehicle's normal driving mode, "background programs" are predominantly what run on the microcontroller of the control unit. In this phase, the software algorithm in the control unit requires little calculation time for crash detection. Upon the occurrence of a collision and for the duration of that crash, the calculation time for the software in the control unit increases significantly as a result of the crash detection and evaluation. With a conventionally designed monitoring device, i.e. watchdog, the timing pattern constituting a threshold value must be adjusted so that even during the collision and its duration, the watchdog can be operated at the correct time by the program executing on the microcontroller, so that crash evaluation processing can proceed without interference.

SUMMARY OF THE INVENTION

The method and the apparatus according to the present invention for adapting a monitoring device of a control unit for a restraint system of a motor vehicle, in contrast, allow faulty behavior by the microcontroller in the control unit of the restraint system to be detected earlier, and at the same time allow the risk of an undesired improper operation of the monitoring device to be prevented. The advantage of this is that the monitoring device can be designed optimally for a crash situation in terms of the increased calculation time, thus also improving robustness regarding malfunctions and failures.

The basic idea of the present invention is explained below.

The gist of the present invention is a coupling of the timing pattern of the monitoring device to the redundant detection device, i.e. the hardware crash detection system. In this context, the timing pattern for the watchdog or monitoring device can be selectively adapted to the time conditions in normal driving mode and in a crash situation.

An important advantage of the present invention is that the monitoring device can be more "finely tuned" for a normal driving mode, i.e. the timing pattern constituting the threshold value is given a lower value. The result is that faulty behavior by the microcontroller is detected substantially earlier, so that possible unintended effects are prevented more reliably than in the conventional instance.

This advantageously creates the possibility of designing the monitoring device optimally for a crash situation, and designing its execution optimally for the increased calculation time associated therewith. Robustness regarding undesired triggering of the monitoring device during a crash is thereby also enhanced.

The method according to the present invention for adapting a monitoring device of a control unit for a restraint system of a motor vehicle, having a redundant detection device and a triggering unit, encompasses the following method steps:

(S1) providing a first definable threshold value as a timing pattern for the monitoring device in a first operating range of the motor vehicle;

(S2) detecting at least a second operating range of the motor vehicle by way of the redundant detection device at a first point in time; and (S3) transferring data from the redundant detection device to the monitoring device in order to adapt the monitoring device by utilizing at least one second definable threshold value in the second operating range of the motor vehicle.

A coupling using a transfer of data from the detection device to the monitoring device advantageously makes it possible to utilize the data present in the detection device in the context of a crash event for adaptation in the monitoring device. The adaptation is advantageously accomplished by the modification of threshold values that correspond to an indication of the calculation time of the control unit, empirical numerical values being utilized.

It is advantageous that in method step (S3), the transfer of data for adaptation of the monitoring device at the first point in time occurs simultaneously with transfer of a triggering signal to the triggering unit, since this information is thus available to the monitoring device right at the beginning of a crash event, in timely fashion for prompt adaptation.

In a further embodiment of the present invention, provision is made for the adaptation of the monitoring device to be carried out in steps. An advantageous adaptation to the profile of the actual calculation time of the microcontroller of the control unit is thereby achieved.

A further preferred embodiment of the present invention provides that the transfer, in method step (S3), of data for adaptation of the monitoring device is accomplished via software within a program segment and/or a subprogram. In such a case it is possible that program portions and/or subprograms, having fixed or even different adaptation values and already previously stipulated for adaptation of the monitoring device, are available and can be retrieved upon transfer of the data from the detection device; this advantageously takes place within the software and thus requires no additional physical space.

In a further embodiment, in method step (S3), after termination of the second operating range, an adaptation of the monitoring unit is accomplished at a second point in time by utilizing the first threshold value or a further threshold value in a third operating range of the motor vehicle. A broader adaptation to further operating ranges of the motor vehicle can advantageously be accomplished in this fashion, thereby expanding the applicability of the present invention.

In order to carry out the method according to the present invention, an apparatus according to the present invention for adapting a monitoring device of a control unit for a restraint system of a motor vehicle, having a redundant detection device and a triggering unit, is characterized in that the redundant detection device is coupled to the monitoring device via a coupling connection. It is advantageous in this context that the coupling connection is embodied as a wire-conducted connecting link, thereby enabling easy installation.

In a further embodiment, the coupling connection is embodied as an optical connecting link, which has advantageous consequences when the control unit and the systems connected to it are embodied using optical connecting technology. This makes the apparatus according to the present invention advantageously versatile.

In a preferred embodiment, provision is made for the coupling connection to be embodied in software fashion between application-specific integrated circuits (ASICs) of the detection device and the monitoring device. This is particularly advantageous because this is carried out only in the software sector, advantageously economizing on physical space.

DETAILED DESCRIPTION

Figure 1:
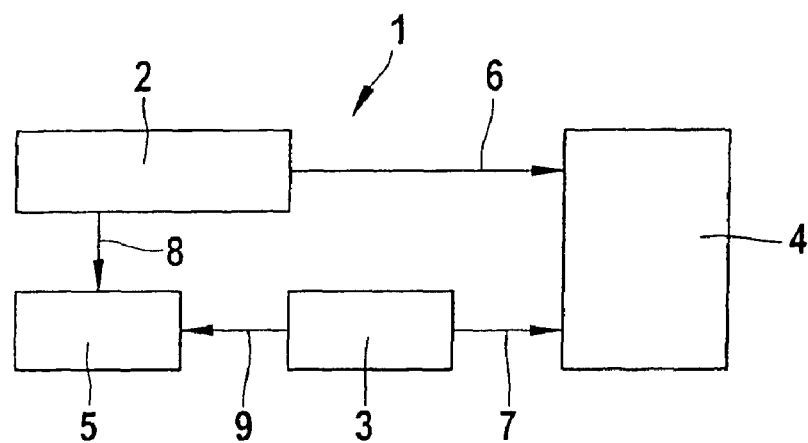
FIG. 1 is a block diagram of an embodiment of the apparatus according to the present invention.

In a restraint system for a motor vehicle, the schematic configuration of which system is depicted by way of example in FIG. 1, a control unit 2 is connected to a triggering unit 4 via a control connection 6. Triggering unit 4 is additionally connected to a detection device 3 via an enabling connection 7. Control unit 2 is furthermore connected to a monitoring device 5, called a "watchdog," via a monitoring connection.

Triggering unit 4 triggers a restraint means (not depicted), for example an airbag, only when a signal from control unit 2 via control connection 6, and a signal from detection device 3 via enabling connection 7, are present. When a crash situation of this kind exists, control unit 2 has detected the collision via a sensor (not shown), and detection device 3 has plausibilized that crash situation via a sensor (likewise not depicted).

This configuration described above, and the functionality described above, are both known.

In contrast to the conventional configuration, however, a coupling connection 9 is provided between detection device 3 and monitoring device 5. This coupling connection 9 can be a wire-conducted or a wireless connection, for example an optical connecting link.

As long as detection device 3 has not detected a crash event, monitoring device 5 operates in a specific execution sequence.

In the event a crash occurs and is plausibilized by detection device 3, an information transfer of specific data occurs from detection device 3 via coupling connection 9 to monitoring device 5; this takes place simultaneously with a transfer of an enabling signal via enabling connection 7 to the triggering unit. The specific data from detection device 3 are used for an adaptation of the execution sequence of monitoring device 5.

The method according to the present invention will be described below in detail with reference to FIGS. 2 and 3.

Figure 2:
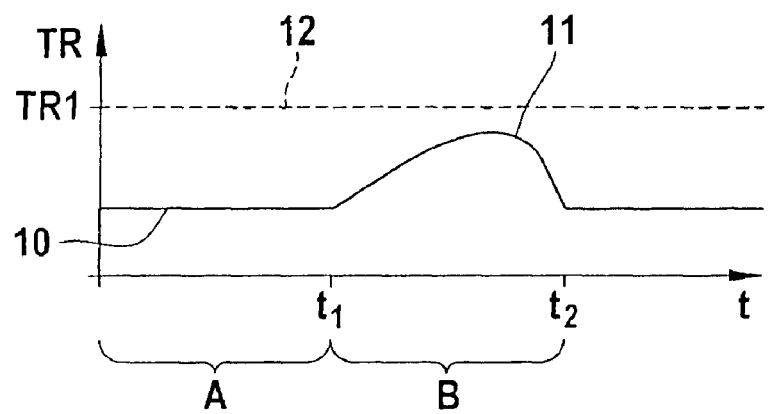
FIG. 2 schematically depicts a calculation time requirement of a control unit in the course of a crash.

In FIG. 2, a graph 10 is plotted in a coordinate system above an abscissa representing time t. Graph 10 represents a calculation time of control unit 2, calculation time TR constituting the ordinate of the coordinate system. In a first operating range A of a motor vehicle, it proceeds approximately parallel to time axis t up to a point in time t1, thus symbolizing a calculation time of control unit 2 in this operating range A which corresponds to a normal driving mode of the motor vehicle. A dashed straight line extending parallel to time axis t represents a threshold value constituting a timing pattern 12 of a specific calculation time at ordinate location TR1, a distance between timing pattern 12 and graph 10 being relatively large in first operating range A.

At point in time t1 a collision or a crash event occurs, which is ascertained by control unit 2 and plausibilized by detection device 3. The crash event is then designated as a second operating range B of the motor vehicle, in which the calculation time of control unit 2 rises significantly up to a maximum 11 of graph 10. The calculation time decreases again at the end of the crash event, at a point in time t2.

In this conventional operating mode, timing pattern 12 must be greater than maximum 11 of the calculation time, as depicted. The distance between timing pattern 12 and graph 10 must therefore be relatively large in first operating range 10. For this reason, malfunctions or failures of control unit 2 cannot be detected by monitoring device 5 in this operating range A.

Figure 3:
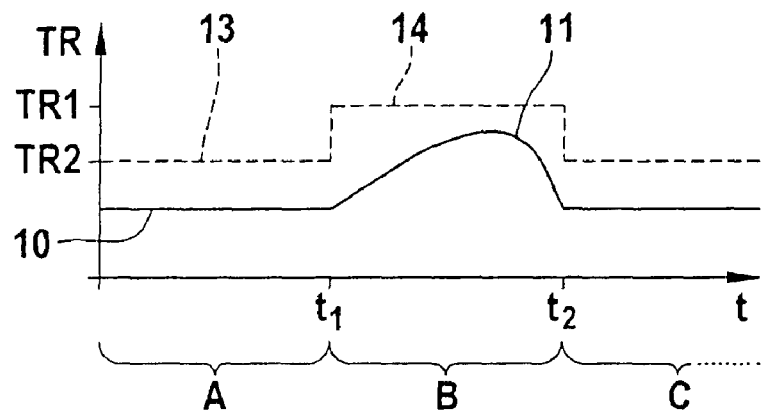
FIG. 3 is a further schematic depiction of the calculation time requirement shown in FIG. 2.

FIG. 3 is a further depiction of the calculation time of control unit 2 according to FIG. 2 with an adapted timing pattern. According to the present invention, a first threshold value 13, at ordinate location TR2, is stipulated as a timing pattern for monitoring device 5 in first operating range A of the motor vehicle. The distance of this first threshold value 13 from graph 10 is selected so that failures of control unit 2 can be recognized much earlier than in the case of the conventional version according to FIG. 2. At point in time t1, at the beginning of a crash event, that event is transmitted by detection device 3 to monitoring device 5, a second threshold value 14 being constituted as a new timing pattern. In second operating range B of the motor vehicle, second threshold value 14 is disposed at a suitable distance from the calculation time (graph 10) and its maximum 11, so that the new timing pattern is advantageously adapted to the increased calculation time requirement. This second threshold value 14, like first threshold value 13, is definable a priori.

The result is to create an adaptive behavior for monitoring device 5 as a function of the operating state of the motor vehicle or as a function of a crash event, so that the monitoring of control unit 2 by monitoring device 3 is advantageously embodied adaptably.

The present invention is not limited to the exemplary embodiments described above, but rather is modifiable in many ways.

For example, it is conceivable for the timing pattern to be adapted, after the crash event, to first threshold value 13 or to a further third threshold value.

It is also possible for the adaptation of the timing pattern to second threshold value 14 to be embodied in stepped fashion or in linearly rising fashion, and thereafter likewise in stepped fashion or linearly falling fashion, in order to achieve even more favorable adaptation.

For control units 2 in which monitoring device 5 and detection device 3 are embodied by application-specific integrated circuits (ASICs), it is additionally possible, in very simple fashion and without a great deal of additional outlay, to embody coupling connection 9 within those circuits e.g. by way of software.

LIST OF REFERENCE CHARACTERS

1 Apparatus
2 Control unit
3 Detection device
4 Triggering unit
5 Monitoring device
6 Control connection
7 Enabling connection
8 Monitoring connection
9 Coupling connection
10 Graph
11 Maximum
12 Timing pattern
13 First threshold value
14 Second threshold value
A, B, C Operating ranges of a motor vehicle
S1-3 Method steps
t Time
t1, t2 Points in time
TR, TR1, TR2 Calculation time(s)

What is claimed is:

1. A method for adapting a monitoring device for monitoring the operation of a control unit for a restraint system of a motor vehicle, including a redundant detection device and a triggering unit, the method comprising:
providing a first definable threshold value as a timing pattern for the monitoring device in a first operating range of the motor vehicle, wherein the first threshold value represents an upper limit of a calculation time of the control unit in the first operating range;
detecting at least a second operating range of the motor vehicle by way of the redundant detection device at a first point in time corresponding to a crash event; and
transferring data from the redundant detection device to the monitoring device in order to adapt the monitoring device by utilizing at least one second definable threshold value as a timing pattern for the monitoring device in the second operating range of the motor vehicle, wherein the second threshold value represents an upper limit of a calculation time of the control unit in the second operating range, and wherein the second threshold value is higher than the first threshold value.

2. The method according to claim 1, wherein in the transferring step, a transfer of data for adaptation of the monitoring device at the first point in time occurs simultaneously with a transfer of a triggering signal to the triggering unit.

3. The method according to claim 1, wherein the adaptation of the monitoring device is carried out in steps.

4. The method according to claim 1, wherein in the transferring step, a transfer of data for adaptation of the monitoring device is accomplished via software within at least one of a program segment and a subprogram.

5. The method according to claim 1, wherein in the transferring step, after termination of the second operating range, an adaptation of the monitoring unit is performed at a second point in time by utilizing one of the first threshold value and a further threshold value in a third operating range of the motor vehicle.

6. A control apparatus for a restraint system of a motor vehicle, comprising:
a redundant detection device;
a triggering unit;
a control unit;
a monitoring device for monitoring the operation of the control unit, wherein the monitoring device is connected to the control unit; and
a coupling connection for coupling the redundant detection device to the monitoring device;
wherein the monitoring device is configured to have a first threshold value as a timing pattern for the monitoring device in a first operating range of the motor vehicle, the first threshold value representing an upper limit of a calculation time of the control unit in the first operating range, and wherein the monitoring device is configured to have a second threshold value as a timing pattern for the monitoring device in a second operating range of the motor vehicle in response to the redundant detection device indicating a crash event defining the start of the second operating range, the second threshold value representing an upper limit of a calculation time of the control unit in the second operating range, and wherein the second threshold value is higher than the first threshold value.

7. The apparatus according to claim 6, wherein the coupling connection includes a wire-conducted connecting link.

8. The apparatus according to claim 6, wherein the coupling connection includes an optical connecting link.

9. The apparatus according to claim 6, wherein the coupling connection includes software between application-specific integrated circuits (ASICs) of the detection device and of the monitoring device.

* * * * *